(12) United States Patent
Kadoguchi et al.

(10) Patent No.: US 11,650,082 B2
(45) Date of Patent: May 16, 2023

(54) POSITION DETECTION SYSTEM AND TRAVEL SYSTEM

(71) Applicant: Murata Machinery, Ltd., Kyoto (JP)

(72) Inventors: Kenji Kadoguchi, Inuyama (JP); Yasutake Yamada, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 476 days.

(21) Appl. No.: 17/044,622

(22) PCT Filed: Mar. 19, 2019

(86) PCT No.: PCT/JP2019/011332
§ 371 (c)(1),
(2) Date: Oct. 1, 2020

(87) PCT Pub. No.: WO2019/193964
PCT Pub. Date: Oct. 10, 2019

(65) Prior Publication Data
US 2021/0148732 A1 May 20, 2021

(30) Foreign Application Priority Data
Apr. 6, 2018 (JP) .............................. JP2018-073858

(51) Int. Cl.
*G01D 5/245* (2006.01)
*G01D 5/14* (2006.01)
(Continued)

(52) U.S. Cl.
CPC ........... *G01D 5/2451* (2013.01); *B65G 43/00* (2013.01); *G01D 5/147* (2013.01); *G01D 5/20* (2013.01)

(58) Field of Classification Search
CPC ........ G01D 5/2451; G01D 5/147; G01D 5/20; B65G 43/00
(Continued)

(56) References Cited

U.S. PATENT DOCUMENTS 7,994,742 B2 * 8/2011 O'Day ................. G01D 18/001
  318/135
2008/0265826 A1 * 10/2008 Sasaki .................. H02K 11/215
  318/687

(Continued)

FOREIGN PATENT DOCUMENTS

JP       10-267609      10/1998
JP      2008-286806    11/2008
(Continued)

*Primary Examiner* — Gene O Crawford
*Assistant Examiner* — Lester Rushin, III
(74) *Attorney, Agent, or Firm* — DLA Piper LLP (US)

(57) ABSTRACT

A position detection system includes: two magnet rows including a plurality of magnets arrayed cyclically and repeatedly with an array pattern as one cycle in a detection direction, a magnet in the magnet row and a magnet in the magnet row facing each other at surfaces having different polarities at a specific position in the detection direction; a magnetic sensor disposed between the two magnet rows, a relative position of the magnetic sensor relative to the two magnet rows in the X-axis direction being variable; and a determiner that determines a position of the magnetic sensor in an predetermined direction relative to the two magnet rows based on a detection value of the magnetic sensor.

20 Claims, 9 Drawing Sheets

(51) Int. Cl.
*G01D 5/20* (2006.01)
*B65G 43/00* (2006.01)
(58) Field of Classification Search
USPC .................................. 198/502.3; 310/12.19
See application file for complete search history.

(56) References Cited

U.S. PATENT DOCUMENTS

2009/0243598 A1   10/2009  O'Day
2015/0345992 A1*  12/2015  Shimizu ................. G01D 5/14
                                                  324/207.24

FOREIGN PATENT DOCUMENTS

| JP | 2009-139222 | 6/2009 |
| JP | 2012-005233 | 1/2012 |
| JP | 2013-215021 | 10/2013 |
| JP | 5390109 | 1/2014 |
| JP | 5390919 | 1/2014 |
| JP | 5652639 | 1/2015 |
| WO | 2014/109190 | 7/2014 |

* cited by examiner

POSITION DETECTION SYSTEM AND TRAVEL SYSTEM

TECHNICAL FIELD

This disclosure relates to a position detection system that detects a position by detecting a magnetic flux density of a plurality of magnet rows, and a travel system using the position detection system.

BACKGROUND

International Publication No. 2014/109190 discloses a displacement sensor that detects a position based on a magnetic scale by a magnetic element.

However, it is not considered in the technique of International Publication No. 2014/109190 to employ two magnet rows as a magnetic scale, which has an array in which different poles face each other at a specific position. Thus, there is a problem that it is difficult to appropriately detect the position of the displacement sensor with respect to the two magnet rows. The difficulty of detecting the position of the displacement sensor when the two magnet rows are employed will be described below.

It could therefore be helpful to provide a position detection system in which a magnetic sensor disposed at a position between two magnet rows having an array in which different poles face each other at a specific position can appropriately detect the position of the magnetic sensor with respect to the two magnet rows.

SUMMARY

We thus provide:

A position detection system detects a position of a magnetic sensor with respect to magnet rows, the position detection system comprising: two magnet rows that include a plurality of magnets arrayed cyclically and repeatedly with an array pattern as one cycle in a detection direction, a magnet in one row of the two magnet rows and a magnet in the other row of the two magnet rows facing each other at surfaces having different polarities at a specific position in the detection direction; a magnetic sensor disposed between the two magnet rows, a relative position of the magnetic sensor relative to the two magnet rows in the detection direction being variable; and a determiner that determines a position of the magnetic sensor in the detection direction relative to the two magnet rows based on a detection value of the magnetic sensor, wherein the magnetic sensor includes: a first detection element that detects a magnetic flux density; and a second detection element that detects a magnetic flux density and is disposed at a position separated from the first detection element in the detection direction by a distance corresponding to $(2A+1)/4$ cycles of the array pattern, where A is an integer of 0 or more, and the determiner calculates a first electrical phase angle by calculating an inverse tangent of a first ratio that is a ratio of the first magnetic flux density detected by the first detection element and the second magnetic flux density detected by the second detection element, and determines the position of the magnetic sensor using the first electrical phase angle calculated.

According to this, the position detection system determines a position using a first detection element and a second detection element disposed at a position separated from the first detection element in the detection direction by a distance corresponding to $(2A+1)/4$ cycles of the array pattern.

For this reason, even a position detection system that uses two magnet rows having an array in which different poles face each other at a specific position can appropriately detect the relative position of the magnetic sensor with respect to the two magnet rows.

In addition, the determiner may use the first electrical phase angle calculated and first relationship information indicating a relationship between a first electrical phase angle and a position to determine a position associated with the first electrical phase angle calculated in the first relationship information as the position of the magnetic sensor.

For this reason, the position detection system can readily determine the relative position of the magnetic sensor with respect to two magnet rows using detection results of the first detection element and the second detection element.

In addition, the magnetic sensor includes: a third detection element that detects a magnetic flux density, and is disposed at a position separated from the first detection element in the detection direction by a distance corresponding to $(4B+1)/8$ cycles of the array pattern, where B is an integer of 0 or more; and a fourth detection element that detects a magnetic flux density, and is disposed at a position separated from the third detection element in the detection direction by a distance corresponding to $(2C+1)/4$ cycles of the array pattern, where C is an integer of 0 or more, and the determiner may further (1) calculate a second electrical phase angle by calculating an inverse tangent of a second ratio that is a ratio of a third magnetic flux density detected by the third detection element and a fourth magnetic flux density detected by the fourth detection element, (2) calculate an average electrical phase angle that is an arithmetic average of the first electrical phase angle and the second electrical phase angle, and (3) use the average electrical phase angle calculated and second relationship information indicating a relationship between an average electrical phase angle and a position to determine a position associated with the average electrical phase angle calculated in the second relationship information as the position of the magnetic sensor.

According to this, the position detection system can cancel the harmonic components of the third harmonic wave and fifth harmonic wave by calculating the arithmetic average of the first electrical phase angle and the second electrical phase angle. For this reason, the position detection system can reduce the cyclic error of the magnetic field due to the two magnet rows, and can accurately determine the position of the magnetic sensor.

In addition, the array pattern of the two magnet rows may be a Halbach array.

For this reason, it is possible to concentrate the magnetic force lines between the two magnet rows. For example, when a linear motor having two magnet rows as a stator or a movable element is installed, the linear motor can efficiently obtain a driving force due to the electromagnetic induction.

In addition, each of the first detection element and the second detection element is a Hall element, and a detection surface may be disposed in a direction facing one row of the magnet rows.

For this reason, the first detection element and the second detection element can effectively detect the magnetic flux density in the direction perpendicular to the magnet rows.

In addition, each of the first detection element and the second detection element is a coil, and an axis of the coil may be disposed in a direction perpendicular to the two magnet rows.

For this reason, the first detection element and the second detection element can effectively detect the magnetic flux density in the direction perpendicular to the magnet rows.

In addition, a travel system includes: the above position detection system; a traveling vehicle driven by a linear motor in which the two magnet rows are included as a stator or a movable element; and a controller that controls travel of the traveling vehicle by driving the linear motor according to the position of the magnetic sensor detected in the position detection system.

In this way, the two magnet rows which are used as a stator or a movable element of the linear motor for causing the first transport carriage to travel can be used in the position detection system for detecting the position of the traveling vehicle. For this reason, the manufacturing cost can be reduced.

The article transporting device can appropriately detect the position of the magnetic sensor with respect to two magnet rows when the magnetic sensor is disposed at a position between the two magnet rows having an array in which different poles face each other at a specific position.

Figure 1:
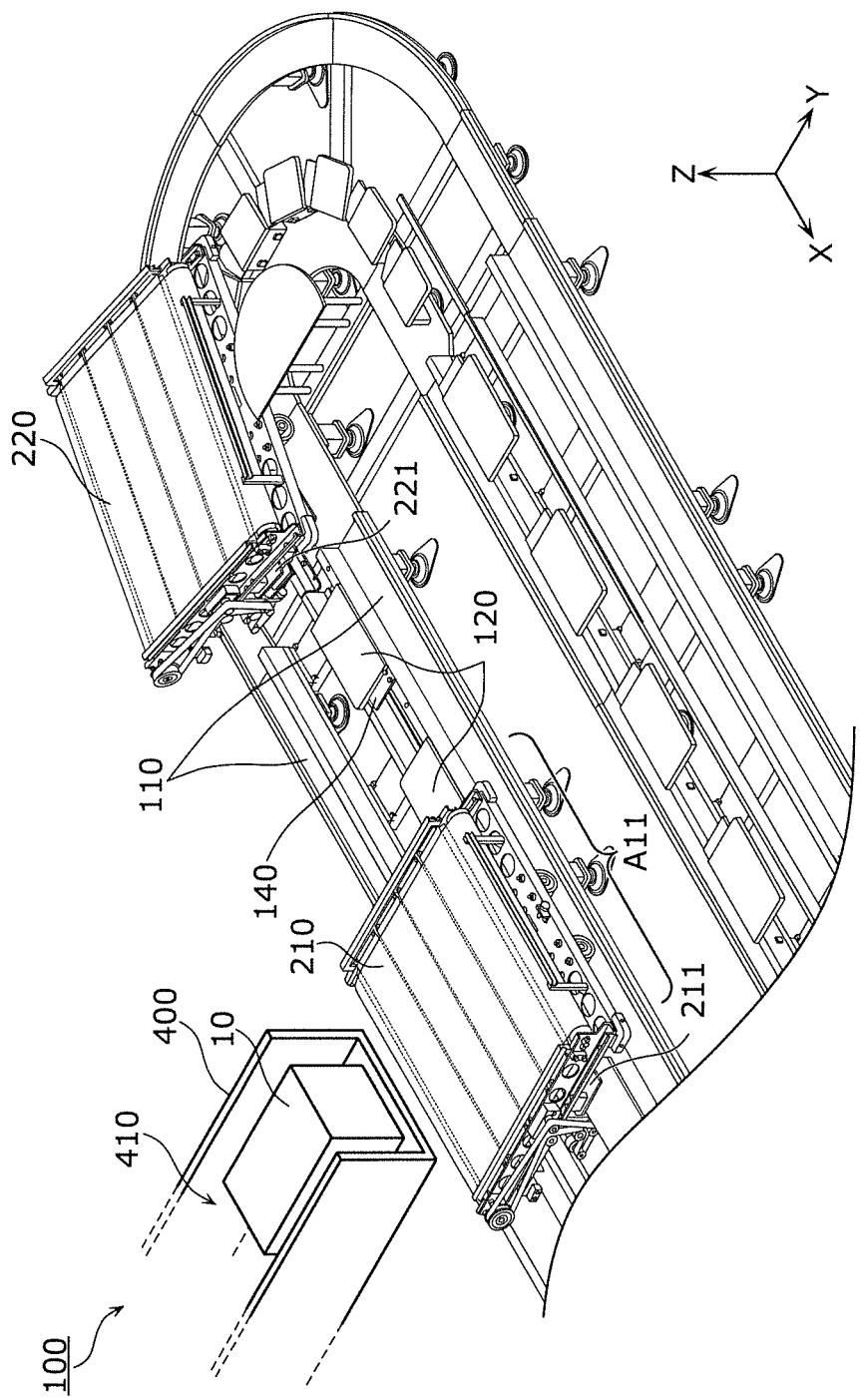
FIG. 1 is a perspective view describing a configuration of an article transporting device according to an example.

| Reference Signs List | |
|---|---|
| 10 | Article |
| 100 | Article transporting device |
| 110 | Traveling rails |
| 120 | Primary side stator group |
| 130 | Power source |
| 131 | Primary side stator |
| 140 | Position sensor |
| 141 | Determiner |
| 150, 150a | Position detection system |
| 210 | First transport carriage |
| 211, 211a, 221 | Secondary side movable element |
| 212, 222 | Transfer part |
| 213, 223 | Secondary side rotor |
| 214, 224 | Transfer conveyor |
| 215, 225 | Belt |

| Reference Signs List (-continued) | |
|---|---|
| 217, 227 | Frame |
| 218, 228 | Roller |
| 219, 229 | Support member |
| 220 | Second transport carriage |
| 300 | Controller |
| 400 | Transport device |
| 510, 510a, 520, 520a | Magnet row |
| 511 to 514, 511a, 512a, 521 to 524, 521a, 522a | Magnet |
| 600 | Magnetic sensor |
| 601 | First detection element |
| 602 | Second detection element |
| 603 | Third detection element |
| 604 | Fourth detection element |

DETAILED DESCRIPTION

In International Publication No. 2014/109190, a technique for detecting the position of a magnetic sensor with respect to a magnet row in which S-poles and N-poles are alternately disposed is disclosed. Such a magnet row forms a magnetic field in which magnetic force lines are directed in different directions depending on the position of the magnet row in the arrangement direction.

A technique for determining the position of the magnetic sensor by utilizing the magnetic force lines having such a shape with respect to the arrangement direction of the magnet row is known. In this instance, for example, the magnetic sensor includes two detection elements that detect the magnetic flux density at a specific position (same phase) on the magnetic sensor. One of the two detection elements faces the magnet row and detects a vertical component that is a component of the magnetic flux density in a direction perpendicular to the magnet row. The other of the two detection elements is parallel to the magnet row and detects a parallel component that is a component of the magnetic flux density parallel to the magnet row. It is possible that the magnetic sensor calculates an electrical phase angle arctan R by calculating the inverse tangent of the ratio R of the magnetic flux densities detected by these two detection elements, and further calculates the position of the magnetic sensor based on the electrical phase angle arctan R.

Since the vertical component and the parallel component of the magnetic flux density exist in the above technique, the position of the magnetic sensor can be detected by detecting the magnetic flux density at one position as described above.

On the other hand, in two magnet rows extending in a predetermined direction, such a configuration that N-poles and S-poles face each other in the facing direction of the two magnet rows is assumed. In this configuration, the magnetic force line generated from the N-pole of one magnet row goes straight to the S-pole of the other magnet row. For this reason, the vertical component of the magnetic flux density can form an extremely large magnetic field as compared with the parallel component. This magnetic field can be used, for example, for a linear motor in which the magnetic force is efficiently supplied to the movable element by disposing the movable element between the two magnet rows in such a direction as to be able to receive the magnetic force due to the vertical component of the magnetic flux density.

However, if the magnet row is an effective magnet array to the linear motor, since the vertical component of the magnetic flux density is extremely large in comparison with the parallel component, it is difficult to detect a change in the magnetic flux density depending on the position with a magnetic sensor that includes a detection element that detects parallel and vertical components of the magnetic flux density at a specific position as described above. For this reason, there is such a problem that even if the magnetic sensor having this configuration uses the detection result of the detection element, the electrical phase angle cannot be calculated, and the position of the magnetic sensor cannot be calculated. Therefore, we found a magnetic sensor having a configuration capable of effectively detecting a position in a magnet row forming a magnetic field in which the vertical component of the magnetic flux density is significantly larger than the parallel component, and a calculation method for calculating the position using the detection result of the sensor.

Our article transporting device including a position detection system and our travel system will be described below with reference to the drawings. Each drawing is a schematic view and is not necessarily an exact illustration.

In addition, examples described below show a specific configuration. Numerical values, shapes, materials, components, arrangement positions and connection forms of components, steps, order of steps and the like shown are examples, and are not intended to limit this disclosure. In addition, among the components in the following examples, the components that are not described in the independent claim indicating the highest concept are described as arbitrary components.

EXAMPLE

First, the outline of article transporting device 100 in an example will be described with reference to FIGS. 1 and 2.

FIG. 1 is a perspective view describing the configuration of the article transporting device according to an example. FIG. 2 is a schematic view of the article transporting device according to the example as seen from the traveling direction of the transport carriage. The traveling path has an annular shape in a plan view in article transporting device 100 shown in FIG. 1, but a straight section in which the traveling direction is the X-axis direction will be described in the following description. That is, it is described in the following description, assuming that the traveling direction is the X-axis direction.

Figure 2:
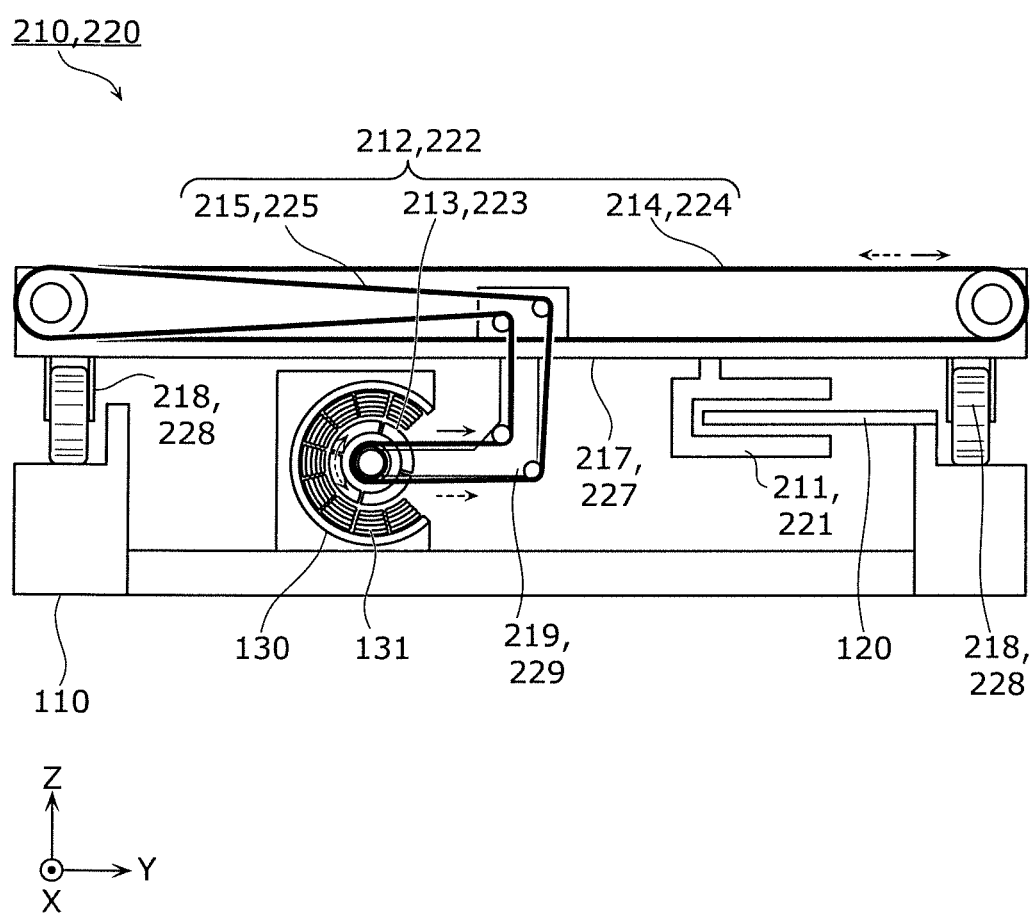
FIG. 2 is a schematic view of the article transporting device according to the example as seen from a traveling direction of a transporting vehicle.

As shown in FIGS. 1 and 2, article transporting device 100 is a travel system that includes traveling rails 110, primary side stator group 120, first transport carriage 210 and second transport carriage 220. In addition, article transporting device 100 further includes power source 130 and position sensor 140.

Traveling rails 110 are members disposed along a traveling path (a path extending in the X-axis direction in FIGS. 1 and 2). Specifically, traveling rails 110 are two long members disposed in a direction orthogonal to the traveling path and long along the traveling path, and comprises a metal such as aluminum, aluminum alloy or the like. Traveling rails 110 may comprise a resin. In this example, traveling rails 110 intersect transport path 410 of transport device 400 that transports article 10, and includes transfer section A11 for transferring article 10 to and from transport device 400, as shown in FIG. 1.

Primary side stator group 120 is an example of a stator group including a plurality of stators. Primary side stator group 120 is disposed along the traveling path. Primary side stator group 120 specifically includes a long plate-shaped substrate that is long along the traveling path and a plurality of coils disposed side by side in the longitudinal direction of the substrate. That is, the plurality of coils substantially functions as a plurality of stators included in primary side stator group 120, respectively. The substrate of primary side stator group 120 is disposed parallel to the horizontal direction (that is, parallel to the XY plane).

The plurality of coils included in primary side stator group 120 is individually controlled by controller 300 (see FIG. 3) and, thereby, each independently generates a magnetic field. In this way, primary side stator group 120 is individually controlled by controller 300 and, thereby, primary side stator group 120 exerts a magnetic action on secondary side movable element 211 provided on first transport carriage 210 and second transport carriage 220. Thereby, primary side stator group 120 applies a force to secondary side movable element 211 in the X-axis direction and causes first transport carriage 210 and second transport carriage 220 to move on traveling rails 110.

Power source 130 is disposed on the traveling path and applies a force to transfer part 212 included in first transport carriage 210 and second transport carriage 220 and causes transfer part 212 to operate.

Position sensor 140 is a sensor that detects each of the positions of first transport carriage 210 and second transport carriage 220. Position sensor 140 is a magnetic sensor and detects the position of a permanent magnet as a detected portion (see later) provided in each of first transport carriage 210 and second transport carriage 220.

Position sensor 140 is disposed along the traveling path. Specifically, position sensor 140 is disposed over the section in which primary side stator group 120 is disposed. Specifically, a plurality of position sensors 140 are disposed on the traveling path, adjacent to each of plurality of primary side stator groups 120 disposed in a predetermined length unit. Thereby, according to respective positions of first transport carriage 210 and second transport carriage 220 detected by position sensor 140, article transporting device 100 can control the traveling operation of each of first transport carriage 210 and second transport carriage 220 by controlling primary side stator group 120 corresponding to the positions.

First transport carriage 210 will be described in detail with reference to FIG. 2.

First transport carriage 210 is a transport carriage having a secondary side movable element 211, and transports an article by secondary side movable element 211 traveling on traveling rails 110 on receiving the magnetic action from primary side stator group 120. First transport carriage 210 includes transfer part 212, frame 217 serving as a base, and traveling roller 218 provided on frame 217 in addition to secondary side movable element 211.

Secondary side movable element 211 is an example of a movable element and also serves as a detected portion. Secondary side movable element 211 includes, for example, a plurality of permanent magnets. The plurality of permanent magnets included in secondary side movable element 211 are disposed side by side in the traveling direction of first transport carriage 210. Secondary side movable element 211 faces the both sides of primary side stator group 120 in the Z-axis direction with first transport carriage 210 disposed on traveling rails 110, and is disposed below frame 217. That is, secondary side movable element 211 has a configuration in which a plurality of permanent magnets is disposed in two rows on both sides of primary side stator group 120 in the Z-axis direction. The plurality of permanent magnets in each of the two rows are disposed in the X-axis direction. First transport carriage 210 individually stops or travels to be able to accelerate and decelerate by a ground primary-side linear motor system including primary side stator group 120 disposed on a predetermined path and secondary side movable element 211 included in first transport carriage 210.

Transfer part 212 receives a force from power source 130 and transfers the article in the intersecting direction (Y-axis direction) that intersects the traveling path. In this example, transfer part 212 transfers the article in the Y-axis direction, but it is not limited to the Y-axis, and it does not need to be exactly orthogonal to the predetermined path as long as it is a direction that intersects the traveling path (the traveling direction of first transport carriage 210). For example, transfer part 212 may intersect the traveling path (the traveling direction of first transport carriage 210) at 45 degrees.

Transfer part 212 specifically includes secondary side rotor 213, transfer conveyor 214, and belt 215. Secondary side rotor 213 is rotated about a rotating shaft extending along the traveling direction of first transport carriage 210. Secondary side rotor 213 rotates by receiving the magnetic force due to the magnetic action from primary side stator 131 of power source 130, and drives transfer conveyor 214. Secondary side rotor 213 is provided at the tip of support member 219 that extends from frame 217 in the Z-axis negative direction and extends from the end on the Z-axis negative side in the Y-axis negative direction. Support member 219 has an L shape when viewed from the X-axis direction.

First transport carriage 210 may not have transfer part 212, and article transport device 100 may not have power source 130.

Power source 130 will be described in detail with reference to FIG. 2.

Power source 130 includes primary side stator 131 having a substantially C-shaped cross section which is disposed at a position surrounding the substantially cylindrical region through which secondary side rotor 213 included in first transport carriage 210 passes when first transport carriage 210 travels. Power source 130 adds a magnetic force due to the magnetic action to secondary side rotor 213 included in first transport carriage 210 by generating a predetermined magnetic field in primary side stator 131. Primary side stator 131 has a shape surrounding a range of about 270 degrees around the traveling direction (X-axis direction) of first transport carriage 210. In other words, primary side stator 131 has a shape in which a part of the side surface of the cylindrical shape corresponding to a range of about 90 degrees is lacking. Primary side stator 131 is disposed in such a direction that the lacking shape part of the cylindrical shape faces the Y-axis positive direction. Power source 130 is disposed in a section on the traveling path in which transfer part 212 of first transport carriage 210 should be driven, and while first transport carriage 210 passes through the section, power source 130 is controlled by controller 300 to drive transfer part 212 of first transport carriage 210 when article 10 is transferred from the outside or article 10 is transferred to the outside.

Transfer conveyor 214 is driven in the intersecting direction by secondary side rotor 213 via belt 215. Transfer conveyor 214 is, for example, a belt conveyor driven in the Y-axis direction, and is disposed on the upper surface of first transport carriage 210. That is, transfer conveyor 214 comprises the placement surface of first transport carriage 210 on which article 10 is placed, and is driven in the Y-axis direction so that article 10 from the outside of first transport carriage 210 in the Y-axis direction is transferred onto the upper surface of first transport carriage 210 (that is, the upper surface of transfer conveyor 214), or article 10 placed on the upper surface of first transport carriage 210 is transferred from the upper surface to the outside of first transport carriage 210 in the Y-axis direction. Transfer conveyor 214 is not limited to a belt conveyor and may be a roller conveyor.

Belt 215 is a belt for power transmission that connects a rotary shaft of secondary side rotor 213 and a rotary shaft for driving transfer conveyor 214, and transmits the rotation from the rotary shaft of secondary side rotor 213 to the rotary shaft for driving transfer conveyor 214. Belt 215 is disposed in an annular shape to follow the positions of frame 217 and support member 219 included in first transport carriage 210 when viewed from the X-axis direction. The annular shape of belt 215 is formed by putting belt 215 on a plurality of pulleys provided on the end surfaces of frame 217 and support member 219 in the X-axis direction.

In this way, since belt 215 is disposed in an annular shape to follow the positions of frame 217 and support member 219 included in first transport carriage 210, it is possible to reduce the dead space caused by the arrangement of belt 215. In addition, since belt 215 penetrates frame 217 substantially vertically, it is possible to reduce the size of the opening for penetrating frame 217. For this reason, it is possible to prevent foreign matter from entering the inside of frame 217.

Belt 215 is, for example, a rubber belt. Belt 215 is not limited to a rubber belt and may be a chain.

Second transport carriage 220 includes secondary side movable element 221, transfer part 222, frame 227 serving as a base, roller 228 for traveling provided in frame 227, and support member 229.

Secondary side movable element 221 has the same configuration as secondary side movable element 211.

Transfer part 222 has the same configuration as transfer part 212. That is, secondary side rotor 223, transfer conveyor 224, and belt 225 included in transfer part 222 have the same configurations as secondary side rotor 213, transfer conveyor 214, and belt 215, respectively.

In addition, frame 227, roller 228 and support member 229 have the same configurations as frame 217, roller 218 and support member 219, respectively.

Figure 3:
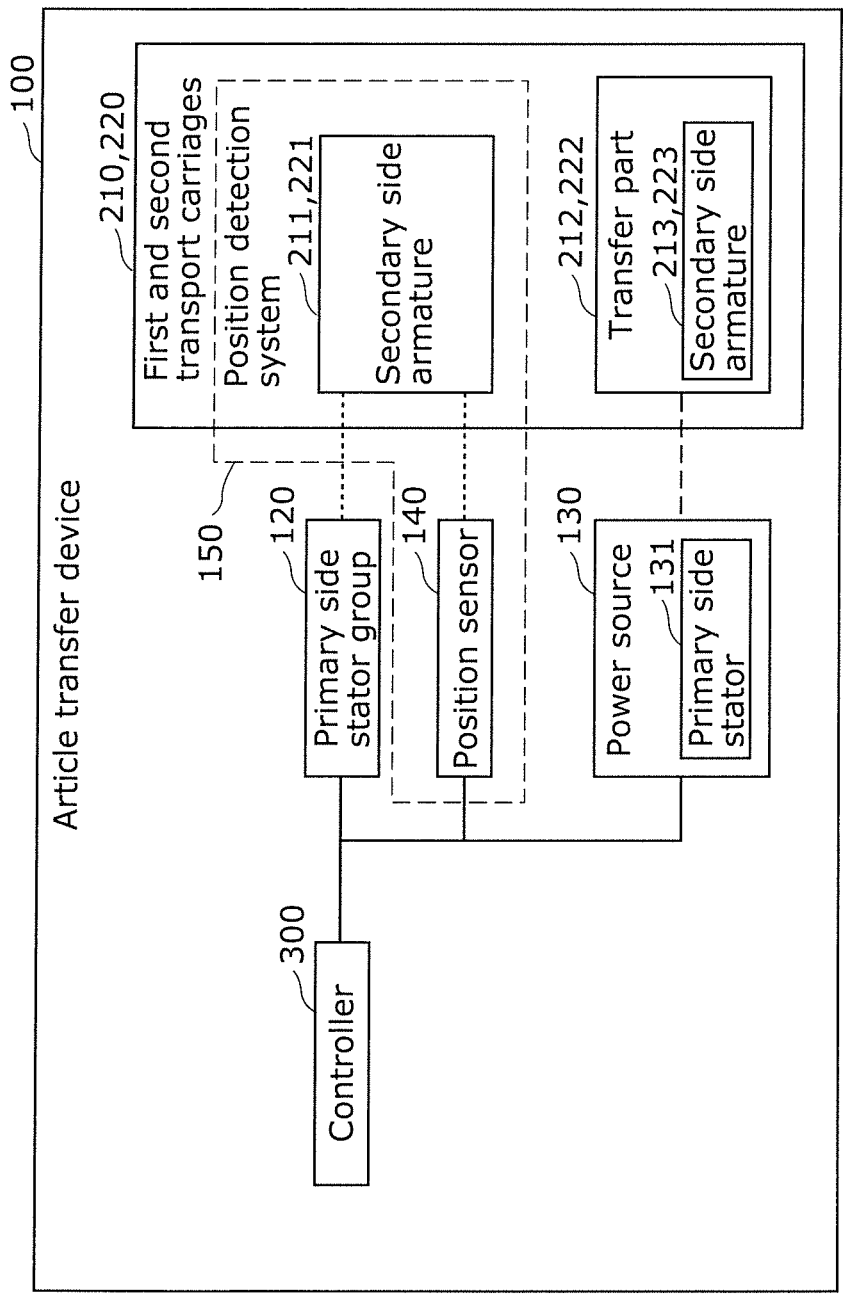
FIG. 3 is a block diagram showing a functional configuration of the article transporting device according to the example.

FIG. 3 is a block diagram showing a functional configuration of the article transporting device according to the example.

Article transporting device 100 includes controller 300, primary side stator group 120, power source 130, position sensor 140, and first transport carriage 210. In addition, position sensor 140 and secondary side movable element 211 of first transport carriage 210 are included in position detection system 150.

Since primary side stator group 120, power source 130, position sensor 140, and first transport carriage 210 (second transport carriage 220) have been described with reference to FIGS. 1 and 2, the description thereof will be omitted. That is, controller 300 will be described here.

Controller 300 controls operation of the ground primary-side linear motor system including primary side stator group 120 and secondary side movable element 211 of first transport carriage 210. Controller 300, for example, transfers an article to and from transport device 400 via transfer parts 212 and 222 with each of first transport carriage 210 and second transport carriage 220 stopped in transfer section A11.

In addition, controller 300 may control primary side stator group 120 to cause first transport carriage 210 and second transport carriage 220 to travel in synchronization.

Controller 300 includes, for example, a processor that executes a predetermined program, a memory that stores the predetermined program and the like. In addition, controller 300 may include a dedicated circuit.

Next, the configuration of position detection system 150 will be described.

Figure 4:
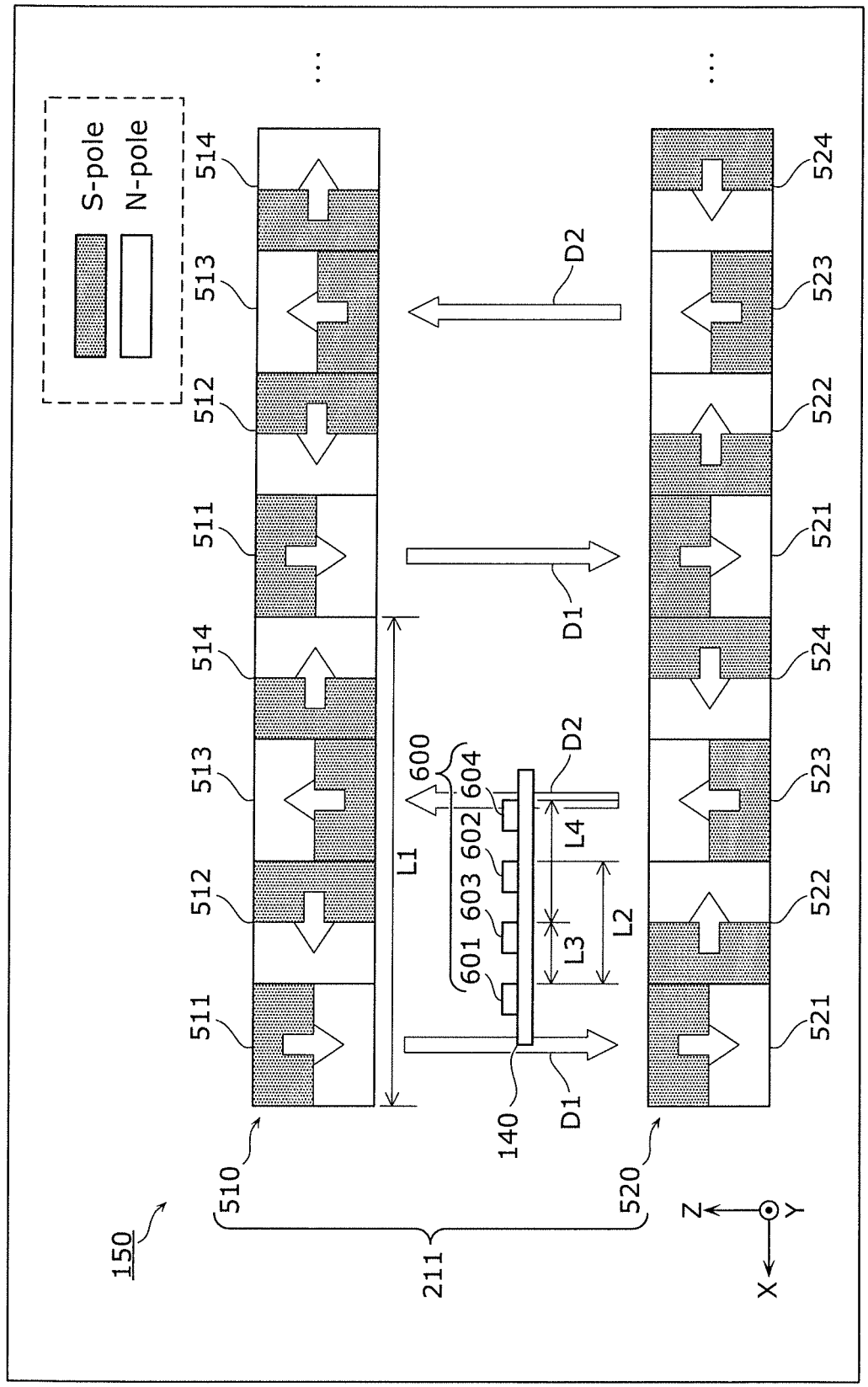
FIG. 4 is a schematic diagram showing an example of a configuration of a position detection system.

FIG. 4 is a schematic diagram showing an example of the configuration of the position detection system.

FIG. 4 shows the relationship between secondary side movable element 211 and position sensor 140.

Secondary side movable element 211 includes two magnet rows 510 and 520. Each of the two magnet rows 510 and 520 includes a plurality of magnets 511 to 514 and 521 to 524 which are cyclically and repeatedly arrayed with an array pattern as one cycle in the X-axis direction which is the traveling direction. Magnet row 510 is one in which a plurality of cycles is repeatedly arrayed with an array pattern in which four magnets 511 to 514 are sequentially disposed as one cycle. Similarly to magnet row 510, magnet row 520 is one in which a plurality of cycles is repeatedly arrayed with an array pattern in which four magnets 521 to 524 are sequentially disposed as one cycle. Thereby, in the array pattern in which four magnets 511 to 514 are disposed, the width of the array pattern in the X-axis direction is distance L1 for the one cycle. The array pattern of the two magnets 510 and 520 is, for example, a Halbach array as shown in FIG. 4.

In addition, in the two magnets 510 and 520, a magnet of one magnet row 510 and a magnet of the other magnet row 520 at an arbitrary position in the X-axis direction face each other at surfaces having different polarities. For example, the N-pole surface of magnet 511 of magnet row 510 and the S-pole surface of magnet 521 of magnet row 520 face each other in the Z-axis direction. In addition, the S-pole surface of magnet 513 of magnet row 510 and the N-pole surface of magnet 523 of magnet row 520 face each other in the Z-axis direction. In this way, since the two magnet rows 510 and 520 have surfaces having different polarities that face each other at specific positions in the X-axis direction, the magnetic flux lines (or magnetic force lines) extend almost straight from the N-poles to the S-poles as indicated by white arrows D1 and D2 in FIG. 4.

Figure 5:
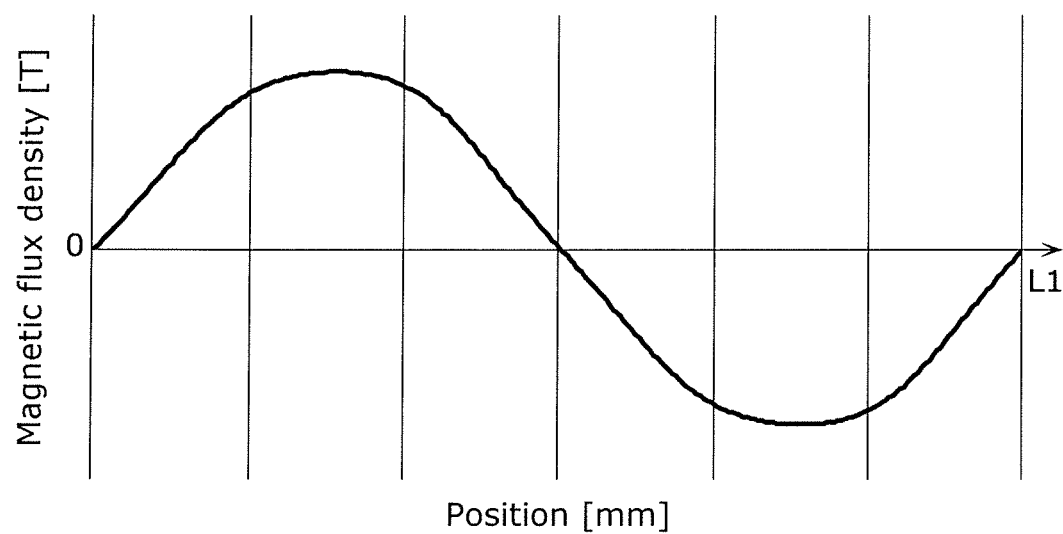
FIG. 5 is a magnetic flux density waveform showing a magnetic flux density distribution in the X-axis direction in a space between the two magnet rows.

In this way, by configuring the two magnet rows 510 and 520 with Halbach arrays, the magnetic flux density in the Z-axis direction of the space between the two magnet rows 510 and 520 has the distribution of the magnetic flux density waveform, for example, shown in FIG. 5.

FIG. 5 is a magnetic flux density waveform showing the magnetic flux density distribution in the X-axis direction in the space between two magnet rows.

As shown in FIG. 5, the magnetic flux density in the Z-axis direction cyclically changes according to the position in the X-axis direction in the space between the two magnet rows 510 and 520. One cycle of the magnetic flux density matches distance L1. In this way, since the magnitude of the magnetic flux density differs depending on the position in the X-axis direction, it is possible to detect the position of magnetic sensor 600 (to be described later) in the X-axis direction by detecting the magnetic flux density. Since the same magnetic flux density is detectable at two different positions in the X-axis direction, it is advisable that magnetic sensor 600 detects the magnetic flux densities at two points separated from each other by 1/4 cycle of the magnetic flux density waveform, rather than detect the magnetic flux density at only one point in the X-axis direction. This allows magnetic sensor 600 to detect the relative position in the X-axis direction with respect to the two magnet rows 510 and 520 of magnetic sensor 600.

The relative position in the X-axis direction with respect to the two magnet rows 510 and 520 of magnetic sensor 600 may be calculated by regarding the position of one detection element of the two detection elements of magnetic sensor 600 and the zero-cross position of the magnetic flux density distribution due to the two magnet rows 510 and 520 as reference positions, respectively. The relative position is, for example, the distance from the zero-cross position of the magnetic flux density distribution described above to the position of the one detection element described above. The relative position may further include a direction from the zero-cross position of the magnetic flux density distribution described above to the position of the one detection element described above. The reference position of magnetic sensor 600 is not limited to the above, and may be, for example, a position shifted in phase by a half cycle from the zero-cross position of the magnetic flux density distribution. In addition, the reference positions of the two magnet rows 510 and 520 are not limited to the above, and the reference positions may be positions separated from the two detection elements by a specified distance.

It is possible to readily calculate the relative position with respect to the two magnet rows 510 and 520 of magnetic sensor 600 from the detected result by storing in a memory in advance relational information indicating a relation between the position and the detected result, which is the detected result when one detection element of the two detection elements of magnetic sensor 600 is in each position of the two magnet rows 510 and 520 in the X-axis direction.

The relational information may be, for example, the following relational expression shown in Equation 1:

$$\text{Position} = (L1/2\pi) \times \theta a \quad (1)$$

wherein L1 represents the length of the one cycle of the array pattern, and θa represents an average electrical phase angle described later.

It is only necessary that the relational information indicates the relation between the position and the magnetic flux density, and it is not limited to the above relational expression. It may be, for example, a table, a graph or the like. It may be a detection result corresponding to the position which is obtained by performing calibration in advance.

Position sensor 140 includes magnetic sensor 600 disposed between the two magnet rows 510 and 520. The relative position of magnetic sensor 600 relative to the two magnet rows in the X-axis direction is variable. Specifically, position sensor 140 includes first detection element 601, second detection element 602, third detection element 603, and fourth detection element 604. Each of detection elements 601 to 604 is an element that detects the magnetic flux density in the Z-axis direction. Each of detection elements 601 to 604 includes, for example, a Hall element, a coil or the like. When each of detection elements 601 to 604 includes a Hall element, it is disposed in such a direction that the detection surface of the Hall element faces one magnet row 510. When each of the detection elements 601 to 604 includes a coil, it is disposed in such a direction that the axis of the coil is perpendicular to the two magnet rows 510 and 520.

First detection element 601 and second detection element 602, are separated from each other in the X-axis direction by distance L2 corresponding to 1/4 cycle of the array pattern.

That is, second detection element 602 is disposed at a position separated from first detection element 601 in the X-axis positive direction by distance L2. Since distance L2 is a distance corresponding to 1/4 cycle of the array pattern, it is 1/4 of distance L1.

Third detection element 603 is disposed at a position separated from first detection element 601 in the X-axis positive direction by distance L3 corresponding to 1/8 cycle of the array pattern. In this example, third detection element 603 is disposed between first detection element 601 and second detection element 602. Since distance L3 is a distance corresponding to 1/8 cycle of the array pattern, it is 1/2 of distance L2. That is, third detection element 603 is disposed just at an intermediate point between the position where first detection element 601 is disposed and the position where second detection element 602 is disposed.

Fourth detection element 604 is disposed at a position separated from third detector element 603 in the X-axis positive direction by distance L4 corresponding to 1/4 cycle of the array pattern. Therefore, distance L4 is equal to distance L2. In addition, since the two sets of detection elements that are separated by the same distance are disposed at positions shifted by 1/2 of the distance, first to fourth detection elements 601 to 604 are disposed at equal intervals at intervals corresponding to 1/8 cycle of the predetermined array pattern. The order to be disposed is first detection element 601, third detection element 603, second detection element 602, and fourth detection element 604 from the X-axis negative direction side.

Position sensor 140 is a sensor that detects the relative position of position sensor 140 with respect to the two magnet rows 510 and 520 using the detection results of first to fourth detection elements 601 to 604. That is, position sensor 140 performs processing to calculate the relative position of position sensor 140 with respect to the two magnet rows 510 and 520 from the detected results obtained by first to fourth detection elements 601 to 604. A configuration that executes the above process performed by position sensor 140 will be described with reference to FIG. 6.

Figure 6:
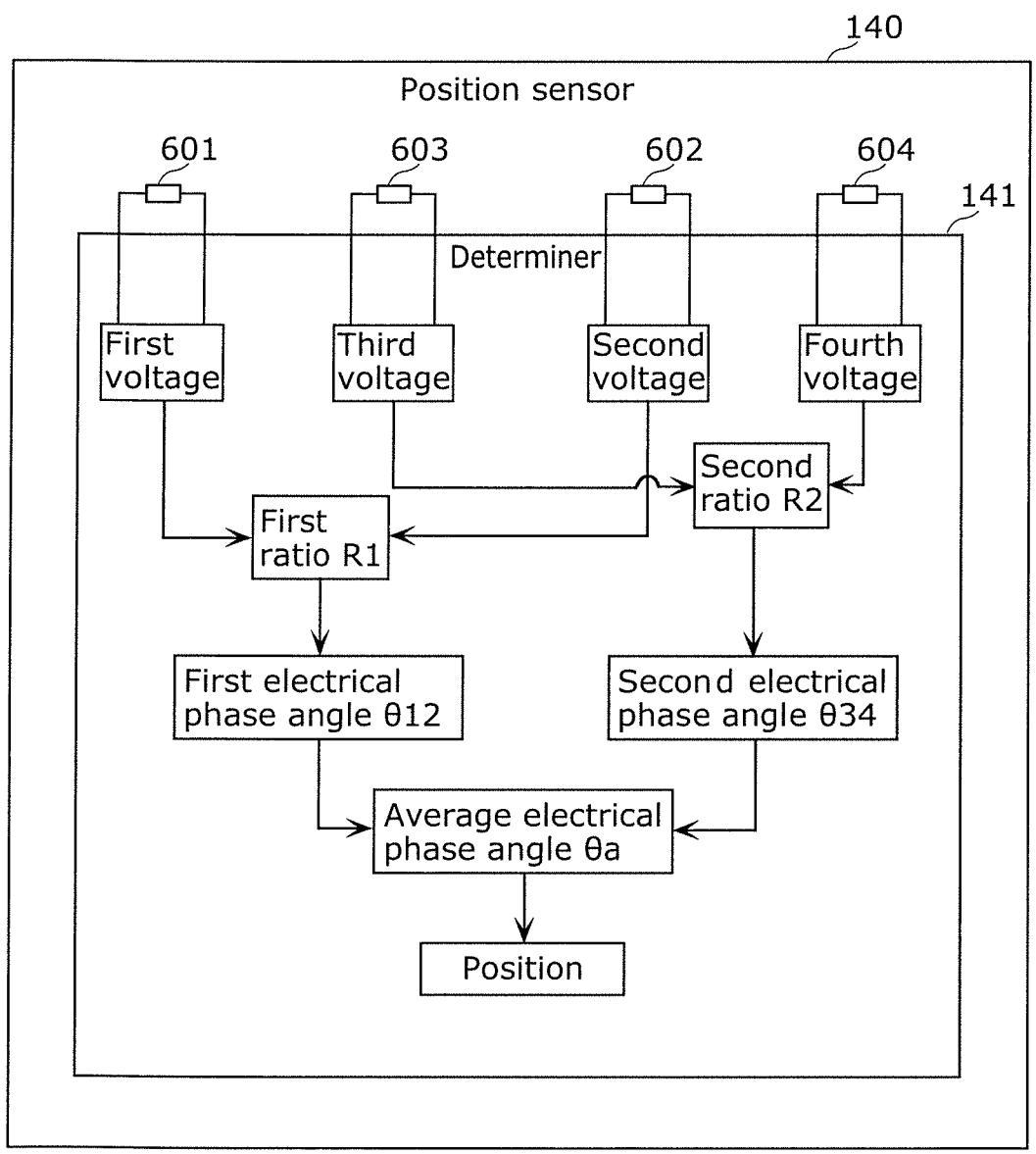
FIG. 6 is a block diagram showing an example of a functional configuration of a position sensor.

FIG. 6 is a block diagram showing an example of the functional configuration of the position sensor.

As shown in FIG. 6, position sensor 140 functionally includes first to fourth detection elements 601 to 604 and determiner 141. Determiner 141 determines the position of magnetic sensor 600 in the X-axis direction with respect to the two magnet rows 510 and 520 based on the detection values of first to fourth detection elements 601 to 604 as magnetic sensor 600.

Determiner 141 acquires, for example, the first voltage indicating the first magnetic flux density from first detection element 601 and the second voltage indicating the second magnetic flux density from second detection element 602. Then, determiner 141 calculates first ratio R1 by obtaining the acquired ratio of the first voltage and the second voltage, and calculates first electrical phase angle θ12 by calculating the inverse tangent of calculated first ratio R1.

In addition, determiner 141 acquires, for example, the third voltage indicating the third magnetic flux density from third detection element 603 and the fourth voltage indicating the fourth magnetic flux density from fourth detection element 604. Then, determiner 141 calculates second ratio R2 by obtaining the ratio of the third voltage and the fourth voltage that were acquired, and calculates second electrical phase angle θ34 by calculating the inverse tangent of the calculated second ratio R2.

Next, determiner 141 calculates average electrical phase angle θa which is the arithmetic average of calculated first electrical phase angle θ12 and second electrical phase angle θ34. Then, determiner 141 determines the position associated with calculated average electrical phase angle θa in the relational information described above as the position of magnetic sensor 600 using calculated average electrical phase angle θa and the relational information that indicates the relation between the average electrical phase angle and the position.

Determiner 141 may repeat the above-described position determination processing at a predetermined sampling cycle, and perform counting, for example, incrementing one each time one array pattern is moved. Thereby, even when magnetic sensor 600 is positioned in the second or subsequent array pattern of the two magnet rows 510 and 520, it is possible to specify what position in the array pattern of a plurality of the array patterns the position is by referring to the counted number.

Determiner 141 includes, for example, a processor that executes a predetermined program and a memory that stores the predetermined program. In addition, determiner 141 may include a dedicated circuit. In addition, controller 300 may have the function of determiner 141.

Next, operation of the position detection system will be described.

Figure 7:
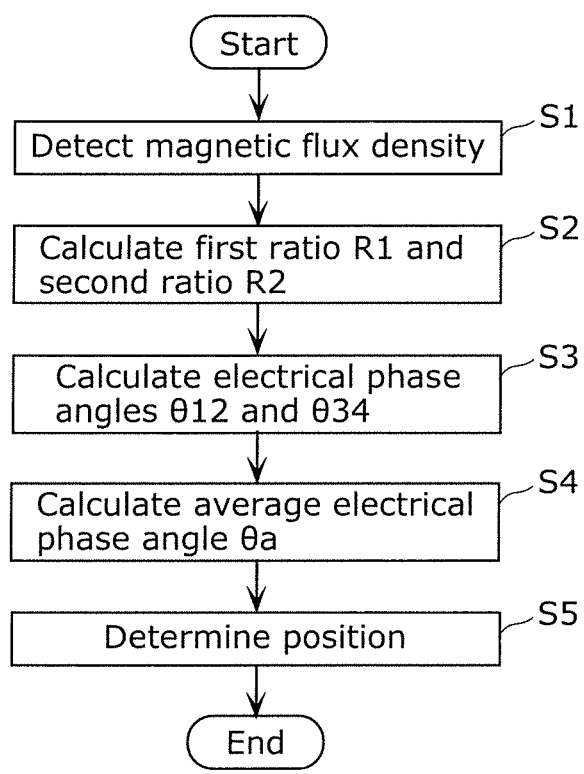
FIG. 7 is a flowchart showing an example of the operation of the position detection system.

FIG. 7 is a flow chart showing an example of the operation of the position detection system.

In position detection system 150, first to fourth detection elements 601 to 604 detect first to fourth magnetic flux densities (S1).

Next, determiner 141 calculates first ratio R1 and second ratio R2 using the first to fourth magnetic flux densities (S2).

Next, determiner 141 calculates first electrical phase angle θ12 and second electrical phase angle θ34 (S3).

Since the method of calculating first ratio R1 and second ratio R2, and the specific method of calculating first electrical phase angle θ12 and second electrical phase angle θ34 are as described above, detailed descriptions will be omitted.

Then, determiner 141 calculates the average electrical phase angle θa by calculating the arithmetic mean of first electrical phase angle θ12 and second electrical phase angle θ34 (S4).

Finally, determiner 141 determines the position associated with the average electrical phase angle θa in relational information as the position of magnetic sensor 600, that is, the position of position sensor 140 (S5). This allows position sensor 140 to detect the position of first transport carriage 210 with respect to the two magnet rows 510 and 520.

Position detection system 150 detects the position of magnetic sensor 600 with respect to the magnet rows. Position detection system 150 includes two magnet rows 510 and 520, magnetic sensor 600, and determiner 141. The two magnet rows 510 and 520 includes a plurality of magnets that are cyclically and repeatedly arrayed with a predetermined array pattern as one cycle in the X-axis direction serving as the traveling direction. In the two magnet rows 510 and 520, a magnet of one magnet row 510 and a magnet of the other magnet row 520 at a specific position in the X-axis direction face each other at surfaces having different polarities. Magnetic sensor 600 is disposed between the two magnet rows 510 and 520, and is disposed to be movable in the X-axis direction relative to the two magnet rows 510 and 520. Determiner 141 determines the position of magnetic sensor 600 in the X-axis direction with respect to the two magnet rows 510 and 520 based on the detection value of magnetic sensor 600. Magnetic sensor 600 includes first detection element 601 that detects the magnetic flux density and second detection element 602 that detects the magnetic flux density. Second detection element 602 is disposed at a position separated from first detection element 601 in the X-axis direction by distance L2 corresponding to 1/4 cycle of the predetermined array pattern. Determiner 141 calculates first electrical phase angle θ12 by calculating the inverse tangent of first ratio R1 of the first magnetic flux density detected by first detection element 601 and the second magnetic flux density detected by second detection element 602. Next, determiner 141 determines the position of magnetic sensor 600 using calculated first electrical phase angle θ12.

In this way, position detection system 150 calculates first electrical phase angle θ12 using the first magnetic flux density and the second magnetic flux density which are detected by first detection element 601, and second detection element 602 disposed at a position separated from first detection element 601 in the X-axis direction by distance L2 corresponding to 1/4 cycle of the predetermined array pattern, and determines the position according to calculated first electrical phase angle θ12. For this reason, even position detection system 150 that uses two magnet rows 510 and 520 having an array in which different poles face each other at a specific position can effectively detect the change in the magnetic flux density according to the position in the X-axis direction. Therefore, it is possible to appropriately detect the relative position in the X-axis direction with respect to the two magnet rows 510 and 520 of magnetic sensor 600 from the value of the magnetic flux density at each of the two points detected by first detection element 601 and second detection element 602 of magnetic sensor 600.

Figure 8:
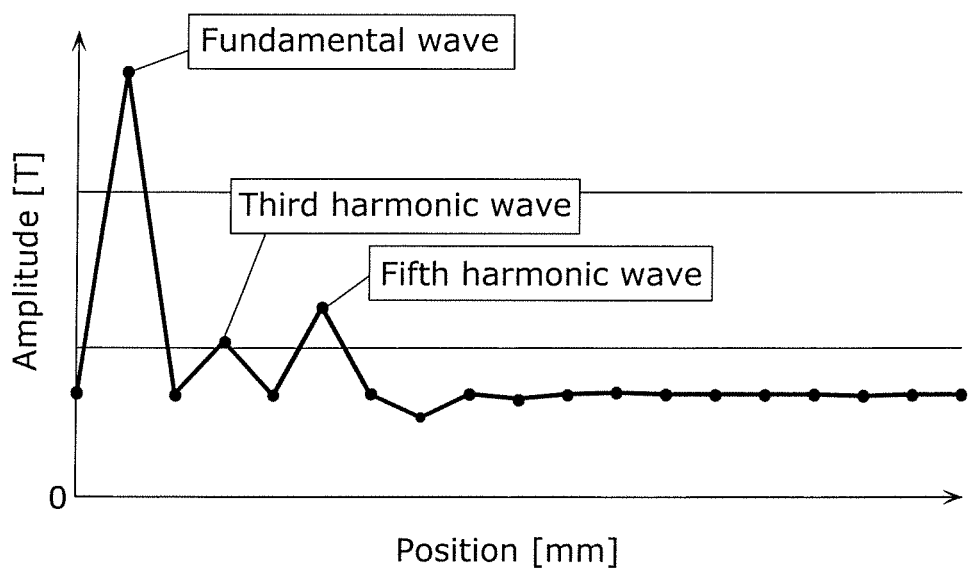
FIG. 8 is a diagram showing a result of performing a fast Fourier transform on the magnetic flux density waveform of FIG. 5.

FIG. 8 is a diagram showing a result of performing a fast Fourier transform on the magnetic flux density waveform of FIG. 5.

As shown in FIG. 8, the components of the third and fifth harmonic waves of the fundamental wave are large in the magnetic field formed by the two magnet rows 510 and 520. Thereby, the magnetic field contains a cyclic error such as a third harmonic wave or a fifth harmonic wave, in addition to the fundamental wave, which causes another problem that it leads to a detection error. Therefore, we provide an error detection element as follows to reduce the cyclic error.

In addition, in position detection system 150, magnetic sensor 600 further includes third detection element 603 and fourth detection element 604 as error detection elements that are disposed at positions separated from first detection element 601 or second detection element 602 by distance L3 corresponding to 1/8 cycle of the predetermined array pattern. In this way, since position detection system 150 includes the error detection elements, it is possible to reduce errors of the relative position in the X-axis direction with respect to the two magnet rows 510 and 520 of magnetic sensor 600, which are obtained by using the detected results of first detection element 601 and second detection element 602.

Specifically, in position detection system 150, the error detection elements include third detection element 603 and fourth detection element 604 for detecting the magnetic flux densities. Third detection element 603 is disposed between first detection element 601 and second detection element 602, and is disposed at a position separated from first detection element 601 in the X-axis direction by distance L3 corresponding to 1/8 cycle of the predetermined array pattern. Fourth detection element 604 is disposed at a position separated from third detection element 603 on the second detection element 602 side by distance L4 corresponding to 1/4 cycle of the predetermined array pattern. Determiner 141 further calculates second electrical phase angle θ34 using second ratio R2 of the third magnetic flux density detected by third detection element 603 and the fourth magnetic flux density detected by the fourth detection element. Then, determiner 141 calculates average electrical phase angle θa by calculating the arithmetic average of first electrical phase angle θ12 and second electrical phase angle θ34. Determiner 141 determines the position associated with the calculated average electrical phase angle in the relational information as the position of magnetic sensor 600 using calculated average electrical phase angle θa and the relational information that indicates the relation between the average electrical phase angle and the position.

According to this, in position detection system 150, the arithmetic average with first electrical phase angle θ12 is calculated using second electrical phase angle θ34 by providing third detector element 603 and fourth detection element 604, and the position of magnetic sensor 600 is determined from the average electrical phase angle θa obtained by the calculated arithmetic average.

Figure 9:
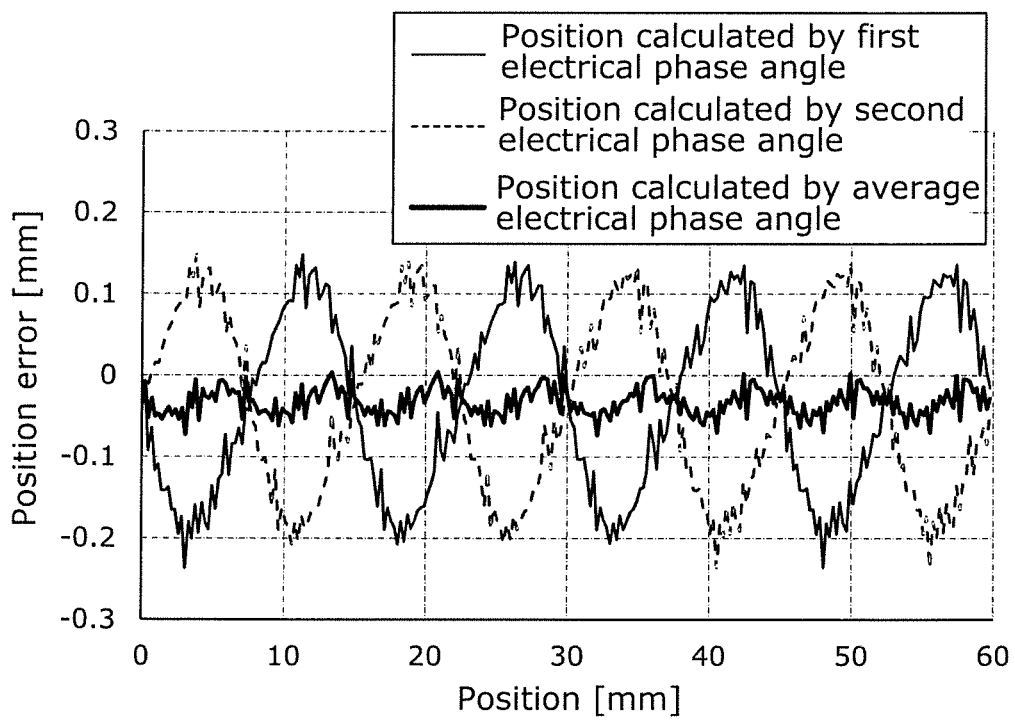
FIG. 9 is a diagram showing position detection errors of a position calculated using the respective first and second electrical phase angles and a position detection error of the position calculated using the average electrical phase angle.

FIG. 9 is a diagram showing position detection errors of a position calculated using the respective first and second electrical phase angles and a position detection error of the position calculated using the average electrical phase angle. The position detection error is the difference between the position calculated using each electrical phase angle and the actual position of position sensor 140.

As shown in FIG. 9, the error in the position detection error of the position calculated using the average electrical phase angle is reduced relative to the error in the position detection error of the position calculated using each of the first and second electrical phase angles.

In this way, the harmonic components of the third and fifth harmonic waves can be canceled by calculating the arithmetic average of first electrical phase angle θ12 and second electrical phase angle θ34 which are detected at positions separated by 1/4 cycle. For this reason, the cyclic error of the magnetic field due to the two magnet rows 510 and 520 can be reduced, and the position of magnetic sensor 600 can be accurately determined.

In addition, in position detection system 150, the predetermined array pattern of the two magnet rows 510 and 520 is a Halbach array. For this reason, the magnetic force lines can be concentrated between the two magnet rows 510 and 520.

In addition, in position detection system 150, each of first detection element 601 and second detection element 602 is a Hall element, and may be disposed in such a direction that the detection surface faces one magnet row 510. In this example, first detection element 601 and second detection element 602 can effectively detect the magnetic flux density in the Z-axis direction.

In addition, in position detection system 150, each of first detection element 601 and second detection element 602 is a coil, and may be disposed in such a direction that the axis of the coil is perpendicular to the two magnet rows 510 and 520. In this example, first detection element 601 and second detection element 602 can effectively detect the magnetic flux density in the Z-axis direction.

In addition, product transport device 100 as the travel system includes position detection system 150, first transport carriage 210 as a traveling vehicle driven by a linear motor in which two magnet rows 510 and 520 are included as a movable element, and controller 300 that controls the travel of first transport carriage 210 by driving the linear motor according to the position of magnetic sensor 600 detected in position detection system 150.

In this way, the two magnet rows 510 and 520 used as a movable element of a linear motor for causing first transport carriage 210 to travel can be used in position detection system 150 for detecting the position of first transport carriage 210. For this reason, the manufacturing cost can be reduced. In addition, since the two magnet rows 510 and 520 are Halbach arrays, the linear motor can efficiently obtain the driving force due to electromagnetic induction.

In position detection system 150 according to the above example, it is assumed that first detection element 601 and second detection element 602 are separated in the X-axis positive direction by distance L2 corresponding to 1/4 cycle of an array pattern, but this disclosure is not limited thereto. It is only necessary that first detection element 601 and second detection element 602 are separated in the X-axis direction by a distance corresponding to (2A+1)/4 cycles (A is an integer of 0 or more) of the array pattern and, for example, they may be separated from each other by a distance corresponding to 3/4 cycle of the array pattern, or may be separated by a distance corresponding to 5/4 cycle.

In position detection system 150 according to the above example, it is assumed that third detection element 603 is separated from first detection element 601 in the X-axis positive direction by distance L3 corresponding to 1/8 cycle of the array pattern, but this disclosure is not limited thereto. It is only necessary that third detection element 603 is separated from first detection element 601 in the X-axis positive direction by a distance corresponding to (4B+1)/8 cycles (where B is an integer of 0 or more) of the array pattern. For example, it may be separated by a distance corresponding to 5/8 cycles of the array pattern, or may be separated by a distance corresponding to 9/8 cycles.

In position detection system 150 according to the above example, it is assumed that fourth detection element 604 is separated from third detection element 603 in the X-axis positive direction by distance L4 corresponding to 1/4 cycle of the array pattern, but this disclosure is not limited thereto. It is only necessary that fourth detection element 604 may be separated from third detection element 603 in the X-axis positive direction by a distance corresponding to (2C+1)/4 cycles (where C is an integer of 0 or more) of the array pattern. For example, it may be separated by a distance corresponding to 3/4 cycle of the array pattern, or may be separated by a distance corresponding to 5/4 cycle.

It is assumed that position detection system 150 according to the above example has the configuration in which third detection element 603 and fourth detection element 604 are provided as the error detection elements, but it may have the configuration in which no error detection elements are provided.

In this example, determiner 141 determines the position associated with first electrical phase angle θ12 in the relational information as the position of magnetic sensor 600 using calculated first electrical phase angle θ12 and relational information that indicates the relation between first electrical phase angle θ12 and the position. In this way, even if magnetic sensor 600 has a configuration including only first detection element 601 and second detection element 602, the position of magnetic sensor 600 can be detected.

Position detection system 150 according to the above-described example uses two detection elements 603 and 604 as the error detection elements. However, first electrical phase angle θ12 calculated by the detection results of first detection element 601 and second detection element 602 may be corrected by using one detection element.

In addition, it is assumed that the array pattern of the two magnet rows 510 and 520 is a Halbach array in position detection system 150 according to the above-described example, but it is not limited thereto. For example, it may have such a configuration that one of the two magnet rows is arrayed such that one magnet or a plurality of magnets has N-poles and S-poles alternately repeated, and the other magnet row is arrayed to face each other at a magnetic pole different from the one magnet row.

Figure 10:
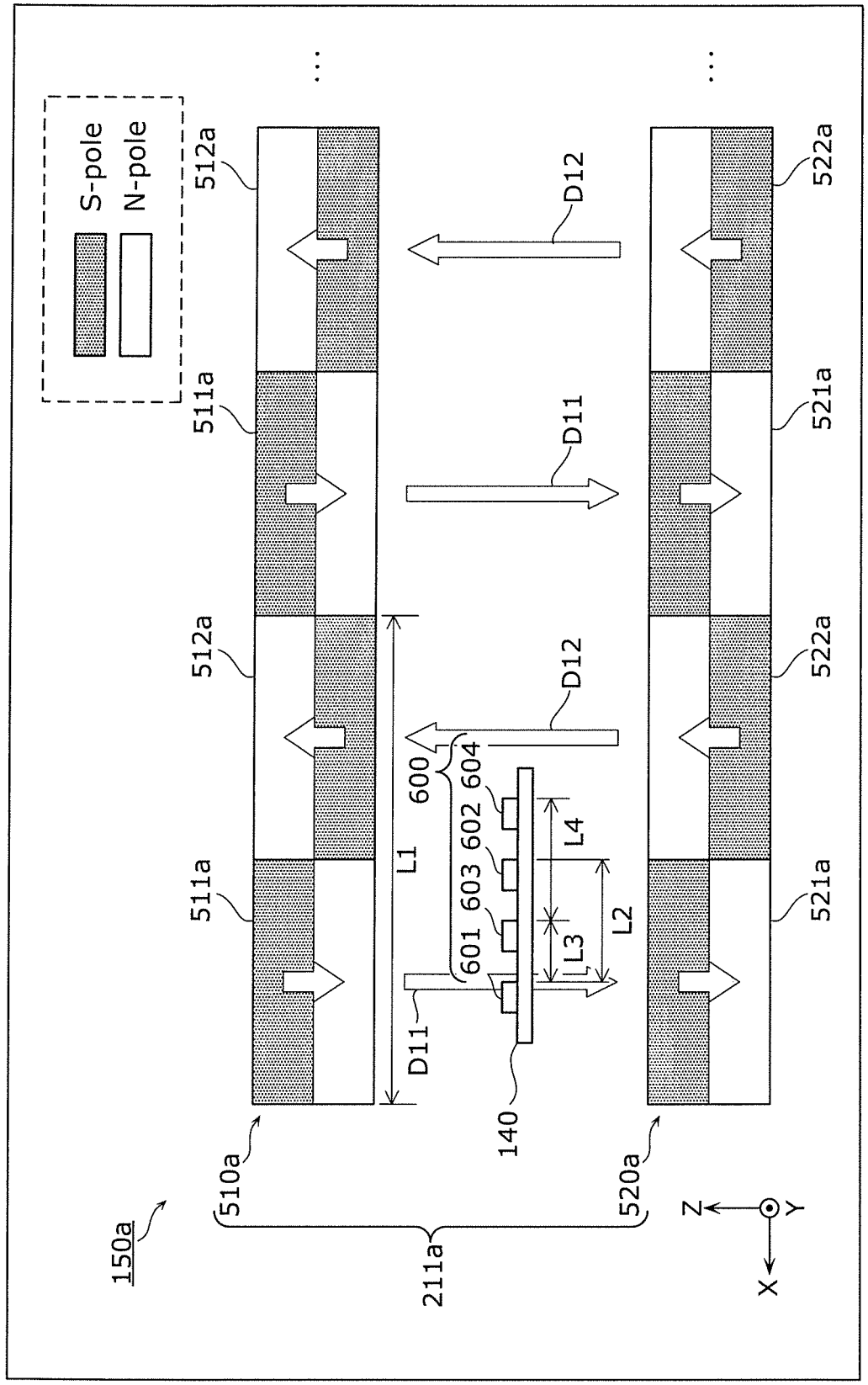
FIG. 10 is a schematic diagram showing another example of the configuration of a position detection system.

FIG. 10 is a schematic diagram showing another example of the configuration of a position detection system.

In position detection system 150a, secondary side movable element 211a includes two magnet rows 510a and 520a. Magnet row 510a includes a plurality of cycles repeatedly arrayed with magnet 511a having a N-pole facing the magnet row 520a side and magnet 512a having a S-pole facing the magnet row 520a side as one cycle. Similarly, magnet row 520a includes a plurality of cycles repeatedly arrayed with magnet 521a having a S-pole facing the magnet row 510a side and magnet 522a having a N-pole facing the magnet row 510a side as one cycle. The N-pole surface of magnet 511a of magnet row 510a and the S-pole surface of magnet 521a of magnet row 520a face each other in the Z-axis direction. In this way, since the two magnet rows 510a and 520a have surfaces having different polarities that face each other at specific positions in the X-axis direction, the magnetic flux lines (or magnetic force lines) extend almost straight from the N-poles to the S-poles as indicated by white arrows D11 and D12 in FIG. 10.

In addition, although article transport device 100 according to the above-described example is a ground primary-side linear motor system, it may be realized by a ground secondary-side linear motor system. That is, magnet rows 510 and 520 may be disposed on the stator side and magnetic sensor 600 may be disposed on the movable element side. In this example, magnet rows 510 and 520 are the stators of the linear motor.

Although our article transport device has been described above based on the examples, our systems are not limited to the examples. As long as it does not depart from the spirit of the appended claims, a form in which various variations conceived by those skilled in the art are applied to this example, or a form constructed by combining components in different examples may be included.

INDUSTRIAL APPLICABILITY

Our systems are useful as a position detection system, travel system and the like that can appropriately detect the position of the magnetic sensor with respect to two magnet rows when the magnetic sensor is disposed at a position between the two magnet rows having an array in which different poles face each other at a specific position.

The invention claimed is:
1. A position detection system that detects a position of a magnetic sensor with respect to magnet rows, the position detection system comprising:
  two magnet rows that include a plurality of magnets arrayed cyclically and repeatedly with an array pattern as one cycle in a detection direction, a magnet in one row of the two magnet rows and a magnet in the other row of the two magnet rows facing each other at surfaces having different polarities at a specific position in the detection direction;
  a magnetic sensor disposed between the two magnet rows, a relative position of the magnetic sensor relative to the two magnet rows in the detection direction being variable; and a determiner that determines a position of the magnetic sensor in the detection direction relative to the two magnet rows based on a detection value of the magnetic sensor, wherein the magnetic sensor includes:
a first detection element that detects a magnetic flux density; and
a second detection element that detects a magnetic flux density and is disposed at a position separated from the first detection element in the detection direction by a distance corresponding to $(2A+1)/4$ cycles of the array pattern, where A is an integer of 0 or more, and the determiner calculates a first electrical phase angle by calculating an inverse tangent of a first ratio that is a ratio of the first magnetic flux density detected by the first detection element and the second magnetic flux density detected by the second detection element, and determines the position of the magnetic sensor using the first electrical phase angle calculated.

2. The position detection system according to claim 1, wherein
the determiner uses the first electrical phase angle calculated and first relationship information indicating a relationship between a first electrical phase angle and a position to determine a position associated with the first electrical phase angle calculated in the first relationship information as the position of the magnetic sensor.

3. The position detection system according to claim 2, wherein the array pattern of the two magnet rows is a Halbach array.

4. The position detection system according to claim 2, wherein
each of the first detection element and the second detection element is a Hall element, and a detection surface is disposed in a direction facing one row of the magnet rows.

5. The position detection system according to claim 2, wherein
each of the first detection element and the second detection element is a coil, and an axis of the coil is disposed in a direction perpendicular to the two magnet rows.

6. A travel system, comprising:
the position detection system according to claim 2;
a traveling vehicle driven by a linear motor in which the two magnet rows are included as a stator or a movable element; and
a controller that controls travel of the traveling vehicle by driving the linear motor according to the position of the magnetic sensor detected in the position detection system.

7. The position detection system according to claim 1, wherein the magnetic sensor includes:
a third detection element that detects a magnetic flux density, and is disposed at a position separated from the first detection element in the detection direction by a distance corresponding to $(4B+1)/8$ cycles of the array pattern, where B is an integer of 0 or more; and
a fourth detection element that detects a magnetic flux density, and is disposed at a position separated from the third detection element in the detection direction by a distance corresponding to $(2C+1)/4$ cycles of the array pattern, where C is an integer of 0 or more, and the determiner further
(1) calculates a second electrical phase angle by calculating an inverse tangent of a second ratio that is a ratio of a third magnetic flux density detected by the third detection element and a fourth magnetic flux density detected by the fourth detection element,
(2) calculates an average electrical phase angle that is an arithmetic average of the first electrical phase angle and the second electrical phase angle, and
(3) uses the average electrical phase angle calculated and second relationship information indicating a relationship between an average electrical phase angle and a position to determine a position associated with the average electrical phase angle calculated in the second relationship information as the position of the magnetic sensor.

8. The position detection system according to claim 7, wherein the array pattern of the two magnet rows is a Halbach array.

9. The position detection system according to claim 7, wherein
each of the first detection element and the second detection element is a Hall element, and a detection surface is disposed in a direction facing one row of the magnet rows.

10. The position detection system according to claim 7, wherein
each of the first detection element and the second detection element is a coil, and an axis of the coil is disposed in a direction perpendicular to the two magnet rows.

11. A travel system, comprising:
the position detection system according to claim 7;
a traveling vehicle driven by a linear motor in which the two magnet rows are included as a stator or a movable element; and
a controller that controls travel of the traveling vehicle by driving the linear motor according to the position of the magnetic sensor detected in the position detection system.

12. The position detection system according to claim 1, wherein
the array pattern of the two magnet rows is a Halbach array.

13. The position detection system according to claim 12, wherein
each of the first detection element and the second detection element is a Hall element, and a detection surface is disposed in a direction facing one row of the magnet rows.

14. The position detection system according to claim 12, wherein
each of the first detection element and the second detection element is a coil, and an axis of the coil is disposed in a direction perpendicular to the two magnet rows.

15. A travel system, comprising:
the position detection system according to claim 12;
a traveling vehicle driven by a linear motor in which the two magnet rows are included as a stator or a movable element; and
a controller that controls travel of the traveling vehicle by driving the linear motor according to the position of the magnetic sensor detected in the position detection system.

16. The position detection system according to claim 1, wherein
each of the first detection element and the second detection element is a Hall element, and a detection surface is disposed in a direction facing one row of the magnet rows.

17. The position detection system according to claim 16, wherein each of the first detection element and the second detection element is a coil, and an axis of the coil is disposed in a direction perpendicular to the two magnet rows.

18. A travel system, comprising:

the position detection system according to claim 16;

a traveling vehicle driven by a linear motor in which the two magnet rows are included as a stator or a movable element; and a controller that controls travel of the traveling vehicle by driving the linear motor according to the position of the magnetic sensor detected in the position detection system.

19. The position detection system according to claim 1, wherein each of the first detection element and the second detection element is a coil, and an axis of the coil is disposed in a direction perpendicular to the two magnet rows.

20. A travel system, comprising:

the position detection system according to claim 1;

a traveling vehicle driven by a linear motor in which the two magnet rows are included as a stator or a movable element; and a controller that controls travel of the traveling vehicle by driving the linear motor according to the position of the magnetic sensor detected in the position detection system.

* * * * *